United States Patent [19]
Appolos

[11] 3,858,600
[45] Jan. 7, 1975

[54] CONNECTION APPARATUS FOR FITTING TO THE FRAME OF A CAMPING GAS STOVE

[75] Inventor: Claude Appolos, Aubervilliers, France

[73] Assignee: Antargaz Societe Anonyme de Distribution de Gaz Liquides de Petrole, Paris, France

[22] Filed: Mar. 29, 1973

[21] Appl. No.: 346,096

[52] U.S. Cl............. 137/322, 137/329.4, 285/304, 285/322
[51] Int. Cl............................................. F16k 31/44
[58] Field of Search ........... 137/315, 316, 317, 318, 137/320, 321, 322, 329.4; 285/162, 316, 304, 319, 321, DIG. 22; 403/325, 329; 215/358, 361; 220/24.5; 138/89; 232/41 D; 248/359, 312, 316 D

[56] References Cited
UNITED STATES PATENTS

| | | | |
|---|---|---|---|
| 1,001,069 | 8/1911 | Nielsen | 285/322 X |
| 1,203,153 | 10/1916 | Stevens | 285/322 X |
| 2,675,829 | 4/1954 | Livers | 285/322 X |
| 3,712,646 | 1/1973 | Bergougnoux | 285/322 |

Primary Examiner—Martin P. Schwadron
Assistant Examiner—David R. Matthews

[57] ABSTRACT

The apparatus described consists of a casing for attachment to a frame element of the stove, conventional means for tapping gas from the cartridge, a sleeve extending over the casing, a series of radial grippers rigidly connected to the frontal end of the sleeve and adapted to the bead of the cartridge mouth, and axial thrust means for mounting the cartridge to the grippers. The sleeve is mobile on the casing and subject to the return action of the axial thrust means toward a position of engagement of the grippers on the cartridge bead.

7 Claims, 4 Drawing Figures

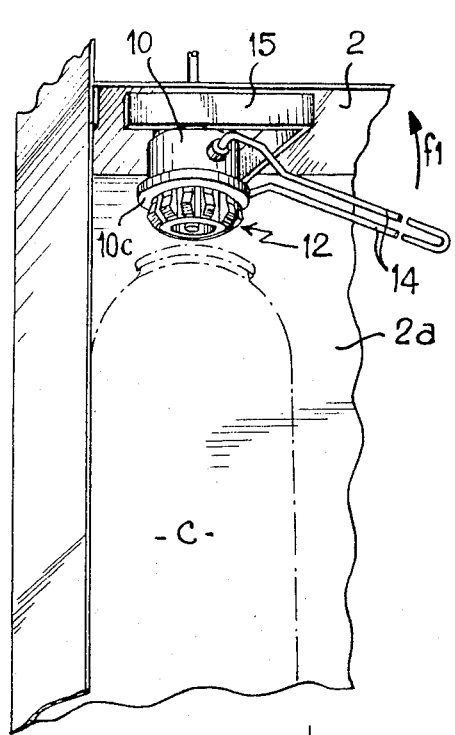
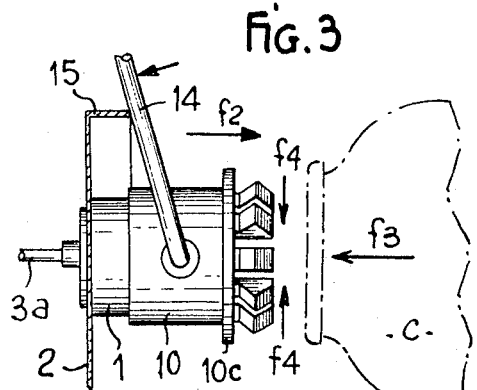
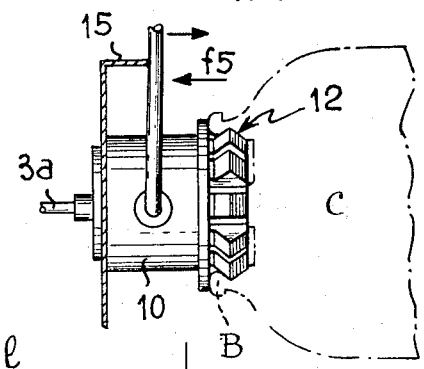
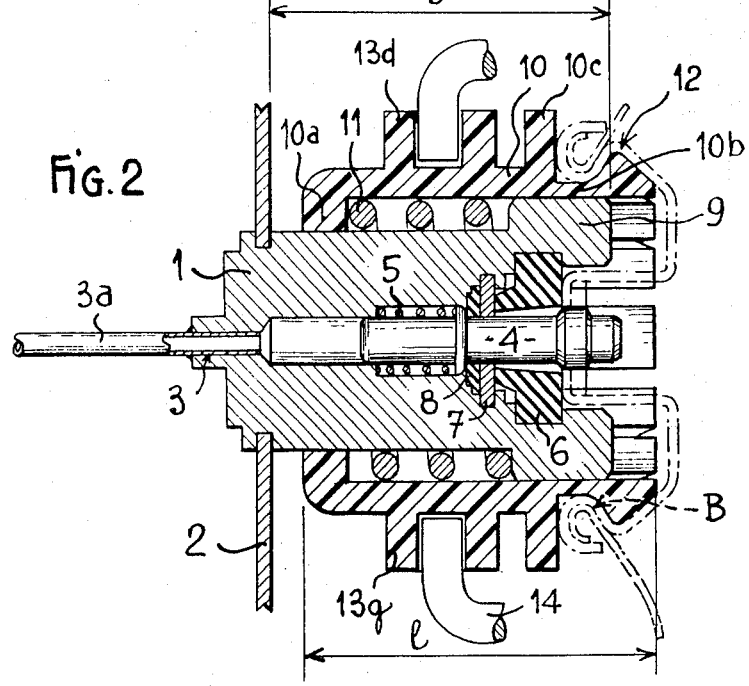

CONNECTION APPARATUS FOR FITTING TO THE FRAME OF A CAMPING GAS STOVE

The present invention relates to a connection apparatus to be fitted to the frame of a camping gas stove to permit mounting of a suitable cartridge of pressurised liquid gas on this frame and tight connection of this cartridge to the piping of the burners of this stove.

Camping stoves are known which have a light frame, forming a flat top and fitted with burners which can be supplied with combustible gas from cartridges of liquid pressurised gas by means of a piping system with a tap rigidly connected to a conventional connection device permitting a tight gas take-off.

A cartridge of this type includes, in effect, a mouth with a valve which can be connected to such a connection device and which can provide a tight gas take-off under the influence of a force applied axially to the cartridge by screw means or elastic thrust means, such as a spring provided under the flat top of the frame of the stove; suitable positioning of the cartridge is, moreover, ensured by fixing means, such as a clamp, also provided under the flat top of the stove.

Now, such connection and fixing means must be manipulated practically simultaneously to ensure that the cartridge is tightly connected under the burner top; such manipulations are therefore awkward and inconvenient.

Gas stoves are also known which simply have a burner mounted on the end of an apparatus for connection to the mouth of a cartridge forming a stove base; this cartridge is charged with pressurised liquid gas and a simple saucepan support can be attached rapidly to this connection apparatus.

A connection apparatus of this type comprises in effect an elastic system of radial grippers which are mobile on a tubular casing to co-operate, under the clamping action of a ring co-axial with the casing, with a bead provided on the mouth of such a cartridge, and with conventional trocar and annular seal means mounted on the casing, to provide a tight gas take-off from the cartridge.

However, these trocar connection devices cannot be fitted to a stove with a flat top because of the difficulties which would be caused by the operation of the trocar under this flat top.

The invention is intended to overcome these disadvantages.

Its object is an apparatus for connection of a pipe for feeding the burners of a stove with a flat top of the type described above, to a cartridge of pressurised liquid gas, provided with a mouth with a gas-valve; such an apparatus ensures, simultaneously and without trouble, the rapid and sure attachment of this cartridge and a tight gas take-off from the latter.

Such an apparatus essentially includes: a tubular casing to be fixed on a frame element of a stove with a flat top and provided with the usual means for tapping gas from a cartridge having a mouth with a valve, an elastic system of radial grippers adapted to a bead of the mouth of the cartridge; and axial thrust means to mount the cartridge on this connection apparatus.

In accordance with the invention, the radial grippers are rigidly connected to the front end of a sleeve which is mobile on the casing and subject to the return action of the axial thrust means towards a position in which the grippers are engaged on the bead of the cartridge.

Preferably, the axial thrust means are mounted co-axially with the casing to obtain a connection apparatus of reduced size.

The bead of the cartridge mouth is advantageously provided on the internal surface of this mouth and the radial grippers can then co-operate with this bead by radial contraction when they are disengaged from the casing by sliding against the axial thrust.

The return of the sleeve onto the casing then firmly locks the grippers between the casing and the mouth of the cartridge while the gas take-off apparatus is engaged in the valve of this cartridge.

A lever is advantageously associated with the sleeve to provide, by bearing against an element of the stove frame, a convenient and rapid sliding action of the sleeve against the action of the axial thrust means.

The invention will be better understood with reference to the attached drawings, which show a preferred embodiment of it, by way of example.

In these drawings,

FIG. 1 shows, in perspective and partly cut away, a gas stove base fitted with a connection apparatus in accordance with the invention;

FIG. 2 shows the apparatus of FIG. 1 in axial section;

FIGS. 3 and 4 are side-elevations for explanation of the operation of the apparatus of FIG. 1.

The connection apparatus, shown in FIGS. 1 and 2, includes a casing 1 rigidly attached to a flange 2 rigidly connected to a frame of a camping gas stove.

This casing 1 has an axial hole 3, in which is tightly mounted a pipe 3a for supplying the burners (not shown) which are suitably fixed on a portion 2a, forming a flat top, of this stove frame.

Bores of suitable diameters have been formed coaxially with hole 3 in this casing for slidable mounting of a tubular element 4, provided with a ring, of a compression spring 5 and of annular rubber seals 6 and 8 separated by a washer 7.

Spring 5 provides a thrust towards the outside of element 4 and seals 6 and 8 and washer 7 are engaged on element 4 to form a conventional tight gas take-off from the valve in the mouth of a cartridge of pressurised liquid gas "C"; this cartridge is shown in outline and partially cut away in the drawings.

At its free end, casing 1 has a cylindrical portion in the form of a ring 9, the outside diameter of which is larger than that of casing 1.

A sleeve 10 of resilient material, in particular polytetrafluoroethylene known by the trade name of Teflon, has a bore suitable for free sliding and swivelling on ring 9 and is engaged on the latter.

One of the ends of sleeve 10 has an internal flange 10a, the bore of which is also adapted for free sliding and swivelling on the lateral surface of casing 1, and a compression spring 11 is engaged on casing 1, bearing against the internal surface of flange 10a and on the radial shoulder surface of ring 9 to return sleeve 10 towards support flange 2.

It will be noticed that the length "l" of the sliding portion of casing 1 and ring 9 is practically equal to the length of sleeve 10. The free end of the latter has longitudinal, uniformly angularly spaced slots, to form between them identical arms 10b which have good radial elasticity.

The ends of these arms are in the form of radial, external teeth 12, the shape of which corresponds to that of an internal mouth bead of cartridge "C" of the type mentioned above.

Furthermore, sleeve 10 has a transversal rib 10c which is situated, on its outer surface, practically at the base of arms 10b to form a stop for the frontal surface of bead "B" of the mouth of a cartridge "C".

Finally, two sockets 13d and 13g are diametrically arranged on the lateral surface of sleeve 10 to receive the ends, which are bent to form swivel pins, of a rod 14 suitably curved to form a lever.

Moreover, a bar 15 is rigidly attached to the edge of flange 2 to form a support for lever 14 when the latter is brought, by swivelling sleeve 10 on casing 1 (arrow f1 - FIG. 1), from its retracted position under flat-top 2a of the frame, to a position outside this frame.

It will be understood that (FIG. 3) this lever 14 then permits movement (arrow f2) of arms 10b to disengage them from ring 9. The mouth of a cartridge "C" can then be applied (arrow f3) to the teeth 12 of these arms 10b arranged in cantilever. Arms 10b are thus subjected (arrow f4) to a radial contraction force until teeth 12 are engaged under the bead "B" of the cartridge mouth, by the natural elasticity of the arms 10b.

Arms 10b thus form a gripper system which provides convenient and rapid mounting of cartridge "C" on the stove frame. Moreover, these grippers are firmly locked between rim "B" and ring 9 when lever 14 is released; in effect, spring 11 returns (arrow f5) sleeve 10 until it is stopped against flange 2 to arrange arms 10b on ring 9.

During this return, element 4 automatically provides a tight gas take-off from cartridge "C" and it may be imagined that the opposite operations to those described above enable cartridge "C" to be disengaged from this connection apparatus, quickly and easily, when the gas charge of this cartridge is exhausted.

Finally, this connection is of a size well adapted to fitting to a light camping stove frame.

Moreover, casing 1 can easily be formed by application of conventional cutting processes. Similarly sleeve 10 can be moulded for an acceptable cost and an inexpensive lever can be obtained by bending and curving a steel wire of suitable diameter.

In addition, these elements (casing 1 provided in advance with a conventional gas take-off apparatus, spring 11 and sleeve 10) can be mounted on each other by simple engagement operations and setting of the end of casing 1 on flange 2 assures their assembly to obtain an inexpensive apparatus, which can then be fitted with lever 14 and the end of supply pipe 3a.

It is wished that this invention is not limited in interpretation except by the terms of the following claims.

I claim:

1. Apparatus for connecting a gas supplying pipe of a stove burner to a pressurized liquid gas containing cartridge having a mouth bead, comprising: a casing for attachment to a frame element of a stove, said casing including means for tapping gas from the cartridge; locking ring means fixedly mounted to a frontal free end of said casing; a sleeve mounted in sliding arrangement over said casing; a series of radial resilient grippers integrally mounted to one end of said sleeve adjacent said frontal free end of said casing; and engagement means for bringing said grippers frontwardly of said locking ring means in a position of engagement with the mouth bead of a cartridge, whereby said resilient grippers may be radially flexed to engage the mouth bead, and for successively ensuring a locking engagement of said grippers with the bead whereby said grippers are slid over said locking ring means.

2. Apparatus as described in claim 1, wherein said engagement means include resilient means mounted co-axially with said casing.

3. Apparatus as described in claim 1, wherein said grippers consist of longitudinal elastic arms provided at their free ends with teeth; stop means located on the external surface of said sleeve to form a stop for the frontal surface of said bead.

4. Apparatus as described in claim 3, wherein said stop means for the frontal surface of the cartridge mouth bead consist of a transversal rib rigidly connected to the outer surface of the sleeve.

5. Apparatus as described in claim 1, wherein said sleeve has an internal flange in sliding engagement with said casing; said engagement means including a compression spring bearing against said locking ring means and said internal flange.

6. Apparatus as described in claim 1, wherein said sleeve consists of a resilient material.

7. Apparatus as described in claim 1, wherein said engagement means further include lever means consisting of a curved steel wire having two ends bent to form swivel pins, said sleeve having two sockets receiving said swivel pins.

* * * * *